July 3, 1956

A. RAMELLA 2,753,295

METHOD FOR THE REMOVAL OF PLUME FROM FLUE GAS PRODUCED
IN CATALYTIC CONVERSION SYSTEMS

Filed July 24, 1952

INVENTOR.
Amilcare Ramella
BY
Andrew L. Gabrianelt
AGENT

United States Patent Office 2,753,295
Patented July 3, 1956

2,753,295

METHOD FOR THE REMOVAL OF PLUME FROM FLUE GAS PRODUCED IN CATALYTIC CONVERSION SYSTEMS

Amilcare Ramella, Woodbury, N. J., assignor to Socony Mobil Oil Company, Inc., a corporation of New York Application July 24, 1952, Serial No. 300,658

10 Claims. (Cl. 196—52)

This invention relates to improvements in the method for the continuous conversion of fluid hydrocarbons in the presence of a solid adsorbent catalyst. It is particularly concerned with a method for the removal of small amounts of organic material or plume from the flue gas produced in the regeneration zone of such processes.

Typical of the processes to which this invention applies is the catalytic conversion of high boiling fluid hydrocarbons to lower boiling hydrocarbons wherein a solid adsorbent catalyst is passed cyclically through successive zones, in the first of which it is contacted with a high boiling fluid hydrocarbon charge at temperatures of 850° F. and upwards to effect the conversion of the charge to lower boiling hydrocarbons which may contain large percentages of gasoline, and in the second of which carbonaceous contaminants deposited on the catalyst are removed by burning with a combustion supporting gas so that the catalyst will be in a suitable condition for reuse in the reaction or conversion zone. Other exemplary processes include the catalytic isomerization, hydrogenation, reforming, dehydrogenation and desulfurization of hydrocarbon fractions.

The catalyst employed in such processes may partake of the nature of natural or treated clays, bauxite, inert carriers impregnated with certain catalyst, active metallic oxides, activated alumina, or magnesia or combinations thereof to which may be added small amounts of metallic oxides for specific purposes.

The catalyst may pass through reaction and regeneration zones as a substantially compact moving mass or as a suspension in a gas stream. Where the moving mass type of process is used, the catalyst should be within the range 3 to 100 mesh and preferably 4 to 15 mesh by Tyler Standard Screen Analysis and may be in the form of pellets, spheres, tablets or irregularly shaped particles. The term "granular" is employed herein broadly in describing and claiming this invention to refer to particles of any of the above sizes and shapes. Where the catalyst is used suspended in a gas stream, the size range will be smaller than shown above and preferably the catalyst is in the form of a finely divided powder.

For purposes of illustration, the invention will be described with reference to a specific process, a catalytic hydrocarbon conversion process employing a moving mass of granular catalyst. In such a process, as previously stated, a carbonaceous contaminant is deposited on the catalyst by the conversion reaction which is removed in the regeneration zone by burning by means of an oxygen-containing combustion supporting gas. This burning produces flue gas at least a portion of which is normally removed from the upper section of the regeneration zone where the catalyst enters from the reaction zone. It has been found that this flue gas will normally contain small amounts of organic material or plume, mainly hydrocarbons, which it would be highly desirable to eliminate therefrom. The word "plume" is used in describing and claiming this invention to include hydrocarbons and oxidation products thereof and sulfur and nitrogen containing compounds thereof, which are condensible under atmospheric conditions. This plume may result from several different causes. First, a portion of the carbonaceous contaminant normally consists of heavy hydrocarbons. During transfer from the reaction zone to the regeneration zone, either in the transfer lines or in the supply bed normally provided above the regeneration zone, a portion or all of this heavy hydrocarbon material may crack to lower boiling hydrocarbons which immediately vaporize at the high temperature of the regeneration zone.

Second, vaporized hydrocarbons or other vaporized organic material may be carried from the reaction zone to the regeneration zone directly in the voids between catalyst particles, especially where the catalyst is not sufficiently purged on leaving the reaction zone.

Third, where the regeneration zone is at a lower pressure than the reaction zone, as is normally the case, vapors in the catalyst pores may expand and leave the pores on entering the regeneration zone.

Fourth, there may be some liquid material in the pores or on the catalyst which will evaporate at the lower pressure normally maintained in the regeneration zone.

Fifth, a portion of the contaminant may be vaporizable under the conditions in the regeneration and be distilled off the catalyst in the upper section of the catalyst bed in the regeneration where the oxygen content of the burning gas may be too low to effect burning of the distilled material.

All of this plume material on entering the regeneration zone will normally immediately enter the flue gas being removed therefrom at an adjacent point. The oxygen content of this flue gas is usually so low that the plume will not burn in the flue gas and therefore is carried out with it and shows up as a cloud in the gas discharged to the atmosphere.

A major object of this invention is to provide, in a continuous process for the conversion of fluid hydrocarbons, an improved method of removing plume from the flue gas produced in the regeneration zone of the process.

Another object of this invention is to provide a continuous process for the regeneration of solid adsorbent catalyst which avoids discharging flue gas from the system with substantial amounts of plume therein.

These and other objects of the invention will be apparent from the following description of the invention and the drawings attached hereto.

This invention provides a method for removing plume from the flue gas produced in continuous hydrocarbon conversion systems wherein a solid adsorbent catalyst is passed cyclically through a reaction zone in which the catalyst contacts a hydrocarbon fluid to effect the conversion of the hydrocarbon fluid and a regeneration zone wherein the catalyst is contacted by a combustion supporting gas to effect the regeneration of the catalyst by burning the carbonaceous contaminant deposited thereon in the reaction zone. In the method of this invention plume-containing flue gas is removed from at least the upper section of the regeneration zone and passed through a bed of cool catalyst maintained within a separate adsorption zone. Plume is removed from the flue gas by adsorption and condensation on the catalyst in the adsorption zone. The catalyst with adsorbed plume is then passed to the regeneration zone as desired, either intermittently or continuously, to effect removal of the plume by burning in the regeneration zone.

This invention will be best understood by referring to the attached drawings, of which:

Figure 1 is an elevational view, partially in section, of a typical continuous hydrocarbon conversion process employing the method of this invention, and Figure 2 is an elevational view, partially in section, of the regeneration vessel employed in the process of Figure 1.

Both of these drawings are diagrammatic in form and like parts in both bear like numerals.

Considering Figures 1 and 2 together, there is illustrated therein, as an example, the application of this invention to a continuous conversion system of the moving mass type employing a granular adsorbent catalyst. In one operation of this apparatus regenerated catalyst, at a temperature suitable for the desired conversion, gravitates from an accumulation thereof in the lower section of a separator 10 downwardly through a feed leg 11 into the upper section of a reaction or conversion zone within a conversion vessel 12. The catalyst passes downwardly through this reaction zone as a downwardly gravitating, substantially compact column. Fluid hydrocarbon charge is supplied to the upper section of this column. The fluid charge may be supplied as separate vapor and liquid fractions which may be charged individually through passages 13 and 14, respectively, or the charge may be entirely vapor or entirely liquid or may be supplied as a single mixed phase stream. When a portion of the charge is in the liquid phase, suitable means to distribute the liquid uniformly over the entering catalyst may be used in the upper section of vessel 12, such as those shown in Hagerbaumer, U. S. Patent No. 2,458,162 and in copending application Serial No. 235,980, filed July 10, 1951. The fluid hydrocarbon charge passes downwardly through the catalyst column in the reaction zone of vessel 12 and is converted at temperatures of the order of 750–1100° F. to gaseous products which are removed from vessel 12 through passage 15. The conversion process deposits a carbonaceous contaminant on the catalyst. In addition, hydrocarbonaceous or organic material, which is vaporizable, may also be deposited on the catalyst. The used catalyst is purged by a suitable inert purge gas, such as steam or flue gas, admitted through passage 16. By this purging most of the vapors existing in the pores between catalyst particles are removed but some organic material of high boiling point will still remain deposited on the catalyst as a part of the carbonaceous contaminant or as a liquid thereon or a vapor in the pores of the catalyst. The used contact material is removed from vessel 12 through passage 17 and then split into a plurality of passages 18 which feed the used contact material to a plurality of supply chambers within the upper section of an annular-shaped regeneration vessel 19. Details of this vessel are shown in Figure 2. A plurality of frusto-conical or frusto- pyramidal supply chambers 20 are provided therein. For example, in a regeneration like that shown, eight such supply chambers may be provided with one of conduits 18 passing into each one. Supply chambers 20 may be either open or closed on top and have sides at angles with the horizontal greater than the angle of repose of the catalyst, preferably 40–65 degrees, to prevent segregation of the catalyst according to particle size. A plenum chamber 21 for a combustion supporting, oxygen containing gas, such as air, is provided below supply chambers 20. This chamber 21 is supplied with combustion supporting gas through one or more passages 22. Beneath chamber 21 is a downwardly gravitating, substantially compact column of used catalyst 23 which acts as the regeneration zone proper. Used catalyst is supplied to this column from supply chambers 20 through passages 24 at a temperature suitable to initiate contaminant combustion, generally at least 700° F. The average temperature of the catalyst column will generally range from about 700° F. to 1000° F., and the pressure from about 10 pounds per square inch above atmospheric to a pressure 5 pounds per square inch below atmospheric. The pressure in the reaction zone is normally higher than in the regeneration zone. Combustion supporting gas passes from chamber 21 downwardly through a plurality of pipes 25 to a central location within catalyst column 23. Combustion supporting gas is discharged from pipes 25 and a portion flows upwardly through the upper section of column 23 while the remainder flows downwardly through the lower section of the column to effect removal of the carbonaceous contaminant by burning. The lower ends of pipes 25 are flared to prevent disruption of column 23 by the gas issuing from the pipes. The combustion supporting gas is converted to flue gas by the burning. Flue gas produced by the upwardly flowing portion of the combustion supporting gas issues from the upper end of column 23, passes around plenum chamber 21 and supply chambers 20 into the space above supply chambers 20. Any plume which is carried in through conduits 18 or is formed in supply chambers 20 passes into this flue gas from either the upper ends of supply chambers 20 or through conduits. Plume may also be formed in the upper section of column 23 by the distillation of vaporizable portions of the contaminant deposits. This latter plume may not be burned because of the low oxygen content of the combustion supporting gas near the top of column 23 and will pass out of the top of the column with the flue gas. The plume-containing flue gas is passed from the upper section of vessel 19 through passage 26. Flue gas produced in the lower portion of column 23 is disengaged from the column by inverted trough collectors 27 and passes downwardly into a plenum space 28 in the lower section of vessel 19 through a plurality of conduits 29 connecting troughs 27 with space 28. Flue gas is removed from space 28 through passage 30. Valves 31 and 32 are provided in conduits 26 and 30 respectively to balance the flow of gas in the upwardly and downwardly flowing streams of combustion supporting gas in column 23 to provide efficient regeneration of the catalyst in column 23 throughout the entire column. Cooling coils 33 are provided at a suitable level in column 23 to prevent overheating of the catalyst to the heat damaging level, generally about 1300° F. Suitable cooling fluid, such as water or steam, may be circulated through these tubes for this purpose. Regenerated catalyst is removed from the lower section of column 23 as a plurality of streams flowing through a plurality of pipes 34. These streams feed to a plurality of collectors 35 in the shape of inverted cones. A single regenerated catalyst stream is withdrawn from each of collectors 35 through conduits 36.

Returning to Figure 1, regenerated catalyst gravitates through passages 36 into the upper section of a lift feed tank 37. Vents 38 are provided on conduits 36. Lift feed tank 37 may be of any of the suitable designs known to the prior art, such as that shown in copending application Serial Number 211,258, filed February 16, 1951, now U. S. Patent 2,695,815. A suitable lift gas, such as air, steam or flue gas is supplied to tank 37 through conduits 39 and 40. Regenerated catalyst is suspended in the lift gas and transported thereby up lift pipe 41 to an intermediate level within separator 10. In the separator lift gas is removed through passage 42 while catalyst settles onto a supply accumulation of catalyst in the lower section of the separator. A portion of the catalyst passes from the separator to reactor 12 as previously described. The remainder of the catalyst passes to an adsorber 43 through conduit 44. Before being supplied to adsorber 43, the catalyst is cooled by passage through a cooler 45 through which a suitable cooling fluid, such as water, is circulated. This cooling should reduce the temperature of the catalyst to a level below about 250° F. and preferably below about 100° F. The cooled catalyst is supplied to an accumulation thereof in the upper section of adsorber 43. This accumulation is maintained on a transverse partition 46 extending across the upper section of the adsorber. A plurality of conduits 47 extend vertically downwardly from partition 46 to an intermediate level within the adsorber. A plurality of substantially compact streams of catalyst flow through passages 47 to supply a substantially compact column or bed 48 of catalyst within the lower section of the adsorber. This bed acts as an adsorbing zone and should be maintained at an average bed temperature below about 600° F. and preferably below about 250° F. Flue gas from the lower section of regenerator 19 is passed directly to a stack 49 through conduit 30. The plume-containing flue gas from the upper section of regenerator 19 is passed through conduit 26 into the lower section of bed 48. The plume-containing flue gas is discharged into the lower section of bed 48 through orifices 50. A gas distributor trough 51 is provided over each orifice. Plume-containing flue gas is passed upwardly through catalyst bed 48 and the plume is removed from the flue gas by adsorption and condensation thereof on the cool catalyst in bed 48. In order to insure that bed 48 remains below a temperature suitable for the adsorption of plume, cooling coils 70 may be provided within bed 48. A suitable cooling fluid may be passed through these coils to extract heat from the bed. In most cases, however, the catalyst will be supplied to bed 48 at a temperature low enough to make the use of coils 70 unnecessary. The flue gas, freed of plume, passes from the upper end of bed 48 and is removed to stack 49 through passage 52. A valve 53 is provided within the conduit 52 to control the rate of flow of flue gas through bed 48. Plume-bearing catalyst is removed from the lower section of bed 48 through passage 54. Passage 54 splits into two branches 55 and 56 bearing valves 57 and 58 respectively. The withdrawal of plume-bearing catalyst from bed 48 may be made continuously or intermittently as desired. When continuous withdrawal is used, bed 48 will exist as a downwardly gravitating, substantially compact mass. Where intermittent withdrawal is used, bed 48 will exist for much of the time as a static mass of catalyst. As shown in Figure 2, conduit 55 connects into the top of supply chamber 20 while conduit 56 extends into the catalyst column 23 and terminates at a level adjacent the level at which combustion supporting gas is supplied to column 23 through pipes 25. Thus, by closing valve 58 and opening valve 57, plume-bearing catalyst from the adsorption zone will pass into supply hopper and mix with the spent catalyst therein. The mixture will then pass into the regeneration zone formed by column 23 where the plume will be burned along with the carbonaceous contaminants on the spent catalyst. Some plume will be released from the plume-bearing catalyst during passage through supply chamber 20 and conduits 24. However, since the plume-bearing catalyst will be substantially cooler than the catalyst supplied to supply chambers 20 from the reaction zone, some residence time will be required to heat the plume-bearing catalyst to a temperature where all the plume thereon is vaporized. By the time this temperature is reached, the plume-bearing catalyst will be down in the body of column 23 at a level where the combustion supporting gas contains enough oxygen to burn the plume. Thus, an equilibrium will be set up wherein a portion of the plume on the entering plume-bearing catalyst vaporizes and is returned to the adsorption zone while the remainder is burned.

Alternatively, the removal of the plume-bearing catalyst may be made through conduit 56 with valve 57 closed and valve 58 open. In this case the plume-bearing catalyst is supplied at a level in column 23 adjacent the level of supply of combustion supporting gas. At this level there is ample oxygen to burn all the plume from the plume-bearing catalyst.

This invention may be operated in another fashion to utilize fresh make-up catalyst in the adsorption zone rather than regenerated catalyst. Some attrition of catalyst particles always occur in cyclic moving bed systems. The fines produced by this attrition are undesirable, since they tend to accumulate in portions of the moving beds and result in channeling of gas flow through the beds. This leads to uneven conversion in the reaction zone and uneven burning in the regeneration zone. To overcome this, these fines are removed either continuously or periodically, normally by elutriation. The catalyst attrition and fines removal make it necessary to add, continuously or periodically, fresh make-up catalyst to the system. The addition of this catalyst presents a special problem. Catalyst when first produced usually contains about 0.8–1.0 per cent moisture by weight based on catalyst heated at 1000° F. for 30 minutes being bone dry. However, in the normal case the catalyst is allowed to stand around for some time before it is used and during the standing the moisture may rise to about 3 to 5 per cent on the same basis. It has been found that catalyst of this moisture content undergoes considerable breakage if heated rapidly in a high temperature gas stream, for example 900–1000° F., or if it is heated by mixing it with hot catalyst at temperatures like those encountered in the aforementioned conversion systems. It has been found that if catalyst containing substantial amounts of moisture is first dried slowly at a temperature below 400° F. to below 1.0 per cent moisture by weight, based on catalyst heated for 30 minutes at 1000° F. being bone dry, the catalyst may thereafter be heated rapidly to the desired operating temperature without substantial breakage. This may be accomplished in the process of this invention while at the same time removing plume from the regeneration zone flue gas. Referring to Figure 1, valve 59 in line 44 is closed and fresh make-up catalyst bearing substantial amounts of moisture is supplied to the upper section of adsorber 43 through passage 60. The make-up catalyst passes downwardly from this upper section through elongated passages 47 to the surface of a bed of make-up catalyst 48. The plume-bearing flue gas normally at temperatures within the range about 700° F. to 900° F. passes into the lower section of bed 48 through conduit 26 and orifices 50 and then passes upwardly through the lower section of bed 48 effecting removal of moisture from the catalyst therein and removal of the plume from the flue gas by adsorption and condensation on the catalyst in bed 48. A portion of the moisture-bearing flue gas, freed of plume, is collected under collectors 73 and passed into conduit 71 through orifices 74. This flue gas is passed to stack 49 at a rate controlled by valve 72. The remainder of the moisture-bearing flue gas passes upwardly through the upper section of bed 48 where, by direct heat exchange with the catalyst, the final step of the required initial slow heating is accomplished and the moisture evolved during the slow heating from the catalyst is swept out with the flue gas. This flue gas then passes out of the upper end of bed 48 around conduits 47 in indirect heat exchange with the streams of fresh make-up catalyst therein to accomplish the first step of the initial slow heating required to avoid breakage before the more rapid heating in the lower section of bed 48. The residence time and rate of heat transfer to the catalyst in conduits 47 and in the upper section of bed 48 should be controlled so that the catalyst supplied to the lower section of bed 48 below conduit 71 will have been dried to a moisture content below 1.0 per cent by weight of the catalyst so that excessive breakage on further heating will be avoided, and also will be at a low enough temperature to effect adsorption and condensation of the plume from the flue gas. Generally, the catalyst delivered to the bed 48 from passages 47 should be at a temperature within the range about 100° F. to 250° F. and preferably within the range about 100° F. to 150° F. The temperature of the catalyst should be at least 400° F. before it reaches the level of conduit 71 and contacts the full flue gas stream. The rate of flue gas removal through conduit 71 is controlled by valve 72 to accomplish this heating without exceeding the heating rate at which excessive breakage occurs. It may be desirable in some applications to provide cooling coils like 70 at some level between conduits 26 and 71 to insure that the temperature of the lower section of bed 48 does not rise above the level where adsorption of plume will occur. In many cases by the proper design of the adsorption vessel it may be possible to pass all the flue gas from the adsorption zone proper lying below conduit 71 through the slow heating zone thereabove in bed 48. Also, in many cases it will be possible to eliminate the indirect heat exchange and do all the slow heating by direct heat exchange. The dried plume-bearing catalyst should be removed from the lower section of bed 48 through passage 54, either continuously or intermittently when the moisture content is below 1 per cent by weight and the plume content is less than 3 per cent by weight of the catalyst. The catalyst is supplied to the regeneration zone for burning as previously described. Thus, when the catalyst used in the adsorber is fresh make-up catalyst, the adsorber functions not only to remove plume from the flue gas, but also acts as a preheater for the make-up catalyst by means of which excessive breakage of the catalyst is avoided.

The various components of the improved method of this invention may take other forms than that shown and described in the above example. For example, while the beds in reaction, regeneration and adsorption zone have been shown in compacted condition, any one or all may exist as suspensions of solids in a suspension gas. In less preferred forms of the invention, spent catalyst may be used in the adsorption zone but regenerated or make-up catalyst is preferred. Also, the plume-bearing catalyst from the adsorber may be supplied to the upper surface of column 23 in the regeneration zone rather than to supply hopper 20 or an intermediate level in 23, or if desired the plume can be removed by supplying combustion supporting gas to the adsorber from time to time and burning the plume there rather than in the regeneration zone. The plume-containing flue gas could be passed downwardly through bed 48 in adsorber 43 rather than upwardly therethrough. The regeneration zone may take many other forms than that shown. For example, the combustion supporting gas could be passed straight through column 23 therein rather than a portion upwardly and a portion downwardly. Also, if desired, all of the flue gas from the regeneration zone could be passed to the absorber rather than just the flue gas from the upper section. As previously stated, the catalyst may be removed from the adsorption zone either continuously or intermittently. In either case, the catalyst should be removed therefrom before the content of adsorbed and condensed plume exceeds 3 per cent by weight of the catalyst.

It is intended to cover all changes and modifications of the examples of this invention herein chosen for purposes of disclosure which do not constitute departures from the spirit and scope of the invention.

What is claimed is:

1. In a continuous process for hydrocarbon conversion wherein a solid adsorbent catalyst is passed cyclically through a reaction zone in which the catalyst contacts hydrocarbon fluid to effect the conversion of the hydrocarbon fluid and a regeneration zone wherein the catalyst is contacted by a combustion supporting gas to effect the regeneration thereof by burning the method for removal of small amounts of plume from the flue gas from the regeneration zone which comprises: passing plume-containing flue gas from at least the upper section of the regeneration zone through a bed of cool catalyst maintained within a separable adsorbing zone whereby the plume is condensed and adsorbed by the catalyst in the adsorbing zone, and effecting removal of the adsorbed plume from the catalyst as desired by passing the catalyst from the adsorbing zone into the regenerating zone to burn the plume therein from the catalyst.

2. In a continuous process for hydrocarbon conversion wherein a solid adsorbent catalyst is passed cyclically through a reaction zone in which it contacts a hydrocarbon fluid to effect the conversion of the fluid and a regeneration zone wherein the catalyst is contacted by a combustion supporting gas to effect the regeneration of the catalyst by burning, the method for removal of small amounts of plume from the flue gas from the regeneration zone which comprises: passing plume-containing flue gas from at least the upper section of the regeneration zone through a bed of cool catalyst maintained within a separate adsorbing zone at an average bed temperature below about 600° F. whereby the plume is condensed and adsorbed by the catalyst in the adsorbing zone, removing catalyst with adsorbed plume from the adsorbing zone before the amount of plume adsorbed by the catalyst exceeds 3 per cent by weight of the catalyst and passing the plume-bearing catalyst into the regeneration zone to burn the plume from the catalyst.

3. In a continuous process for hydrocarbon conversion wherein a granular adsorbent catalyst is passed cyclically through a reaction zone in which the catalyst contacts a fluid hydrocarbon to effect the conversion thereof with resultant deposition of carbonaceous contaminants on the catalyst and a regeneration zone wherein the carbonaceous contaminants are removed by burning, the improved method for regenerating the catalyst so as to effect removal of small amounts of plume from the flue gas from the regeneration zone which comprises: passing the granular catalyst downwardly through the regeneration zone as a substantially compact column, supplying contaminant-bearing catalyst to the upper section of said column and removing regenerated catalyst from the lower section of the column, supplying a combustion supporting gas centrally to said column and passing a portion of the gas upwardly through the upper section of the column and the remainder of the gas downwardly through the lower section of the column to effect burning of the contaminant deposit on the catalyst, removing flue gas from the lower section of said regeneration zone, removing flue gas together with any plume from the upper section of the regeneration zone, passing the flue gas and plume through a bed of cooled catalyst in a confined adsorbing zone to effect removal of the plume by condensation and adsorption on the catalyst, removing the plume-free flue gas from the adsorbing zone, and passing plume-bearing catalyst from the adsorption zone to the regeneration zone to effect burning of the plume therein.

4. In a continuous process for the conversion of hydrocarbons wherein a solid adsorbent catalyst is passed cyclically through a reaction zone in which the catalyst contacts hydrocarbon fluid to effect the conversion of the hydrocarbon fluid and a regeneration zone wherein the catalyst is contacted by a combustion supporting gas to effect the regeneration of the catalyst, the method for removing small amount of plume from the flue gas from the regeneration zone which comprises: passing plume-containing flue gas from at least the upper section of the regeneration zone through a bed of cool fresh make-up catalyst in a confined adsorption zone, said catalyst in said bed initially containing a substantial amount of moisture and at least a portion of said moisture being removed by said flue gas and said plume being adsorbed on said catalyst, removing the moisture containing flue gas, freed of plume, from said adsorption zone, and passing the plume-containing catalyst from said adsorption zone when the moisture content is less than 1 per cent by weight to said regeneration zone to effect the burning of the plume.

5. In a continuous process for the conversion of hydrocarbons wherein a granular adsorbent catalyst is passed cyclically through a reaction zone in which the catalyst contacts hydrocarbon fluid to effect the conversion thereof and a regeneration zone wherein the catalyst is contacted by a combustion supporting gas to effect regeneration of the catalyst by burning off the carbonaceous contaminants deposited on the catalyst in the reaction zone, the method for removing small amounts of plume from the flue gas produced in the regeneration zone which comprises: maintaining a bed of fresh make-up catalyst within a confined adsorption zone, supplying cool fresh make-up catalyst containing substantial amounts of moisture to the upper section of said bed, passing plume-containing flue gas from at least the upper section of said regeneration zone into the lower section of said bed, passing the plume-containing flue gas upwardly through said bed to effect removal of moisture from the catalyst therein and removal of plume from the flue gas by condensation and adsorption on said catalyst, removing the moistures containing flue gas freed of plume from the upper section of said bed and passing said moisture containing flue gas in indirect heat exchange with the make-up catalyst to be supplied to said bed thereby slowly heating said make-up catalyst, removing moisture containing flue gas from said adsorption zone, passing plume-containing catalyst from the lower section of the adsorption zone when the moisture content has been reduced to less than 1 per cent by weight to the regeneration zone to effect the burning of the plume with catalyst.

6. In a continuous process for the conversion of hydrocarbons wherein a solid adsorbent catalyst is passed cyclically through a reaction zone in which the catalyst contacts hydrocarbon fluid to effect the conversion of the hydrocarbon fluid and a regeneration zone wherein the catalyst is contacted by a combustion supporting gas to effect the regeneration of the catalyst, the method for removing small amount of plume from the flue gas from the regeneration zone which comprises: maintaining a bed of regenerated catalyst within a confined adsorption zone, passing a portion of the regenerated catalyst from the regeneration zone to said bed in said adsorption zone, cooling said catalyst before it is supplied to the adsorption zone, passing plume-containing flue gas from at least the upper section of said regeneration zone into said adsorption zone and through said catalyst bed therein to effect removal of the plume therefrom by condensation and adsorption on the catalyst in the adsorption zone, and passing the plume-containing catalyst from the adsorption zone to the regeneration zone as desired to effect removal of the plume from the catalyst by burning.

7. In a continuous process for the conversion of fluid hydrocarbons wherein a granular adsorbent catalyst is passed cyclically through a reaction zone in which the catalyst flows as a substantially compact column and is contacted by a fluid hydrocarbon charge to effect the conversion thereof and a regeneration zone in which the catalyst is contacted by a combustion supporting gas while passing downwardly as a substantially compact column to effect regeneration of the catalyst by burning off the carbonaceous contaminants deposited on the catalyst in the reaction zone, the improved method of eliminating small amounts of plume from the effluent flue gas from the regeneration zone which comprises: maintaining a downwardly gravitating substantially compact column of regenerated catalyst within a separate confined adsorption zone, passing a portion of the regenerated catalyst from the regeneration zone through a cooling zone and cooling the catalyst therein to a temperature below about 250° F., supplying the cooled regenerated catalyst to the upper section of said column in said adsorption zone, passing plume-containing flue gas from at least the upper section of the regeneration zone into the lower section of the adsorption zone, passing the plume-containing flue gas upwardly through the catalyst column in the adsorption zone to effect removal of the plume therefrom by condensation and adsorption on the catalyst in the column, removing flue gas, freed of plume, from the upper section of said adsorption zone and continuously removing plume-bearing catalyst from the lower section of the catalyst column in the adsorption zone and passing it to the upper section of the catalyst column in the regeneration zone whereby the plume-bearing catalyst will pass downwardly through the regeneration zone to effect the burning of the plume.

8. In a continuous process for the conversion of hydrocarbons wherein a granular adsorbent catalyst is passed cyclically through a reaction zone in which the catalyst contacts a hydrocarbon fluid to effect the conversion thereof and through a regeneration zone in which the catalyst is regenerated by means of an oxygen-containing gas, the improved method of regenerating the catalyst to effect elimination of small amounts of plume from the effluent flue gas from the regeneration zone which comprises: passing spent catalyst bearing a carbonaceous contaminant deposited thereon in the reaction zone downwardly through the regeneration zone as a substantially compact column, supplying spent catalyst admixed with plume to the upper section of said column, introducing an oxygen-containing gas centrally into said column and passing a portion of said gas upwardly through said column and the remainder of said gas downwardly through said column to effect the burning of the carbonaceous contaminant on the catalyst, removing flue gas from the lower section of said regeneration zone, removing plume-containing flue gas from the upper section of said regeneration zone, removing regenerated catalyst from the lower section of said column, cooling a portion of the regenerated catalyst to a temperature below about 250° F., passing the cooled regenerated catalyst to the upper section of a downwardly gravitating substantially compact bed of granular catalyst within a confined adsorption zone, supplying the plume-containing flue gas from the upper section of the regeneration zone to the lower section of said bed and passing the plume-containing flue gas upwardly through said bed to effect the removal of the plume from the flue gas by condensation and adsorption on the catalyst in the bed, removing plume-free flue gas from the upper section of the adsorption zone, continuously removing plume-bearing catalyst from the lower section of said bed at a rate such that the plume on the catalyst removed is less than about 3 per cent by weight of the catalyst, supplying the plume-bearing catalyst removed from said bed to said column in said regeneration zone at a level adjacent the level at which oxygen-containing gas is supplied to said column whereby the plume-bearing catalyst will pass downwardly with said column and the plume will be burned.

9. In a continuous process for the conversion of hydrocarbons wherein a granular adsorbent catalyst is passed cyclically through a reaction zone in which the catalyst contacts hydrocarbon fluid to effect the conversion of the hydrocarbon fluid and a regeneration zone wherein the catalyst is contacted by a combustion supporting gas to effect the regeneration of the catalyst, the method for removing small amounts of plume from the flue gas produced in the regeneration zone which comprises: maintaining a downwardly gravitating substantially compact bed of fresh granular make-up catalyst within the lower section of a confined adsorption zone, supplying make-up catalyst containing substantial amounts of moisture to the upper section of said bed as a plurality of confined substantially compact streams, passing plume-containing flue gas from at least the upper section of said regeneration zone into the lower section of said bed, passing the plume-containing flue gas upwardly through said bed to effect removal of moisture from the catalyst and removal of plume from the flue gas by adsorption and condensation on the catalyst, removing moisture containing flue gas from the upper section of said bed and passing said flue gas in indirect heat transfer relationship with said plurality of streams of make-up catalyst supplying said bed, controlling the residence time of catalyst in said streams and the rate of heat transfer to the catalyst such that catalyst is delivered to said bed from said streams at a temperature within the range about 100° F. to 250° F., removing moisture-containing flue gas from the upper section of said adsorption zone, and continuously passing the dried plume-containing catalyst from said bed to said regeneration zone, said catalyst passing to said regeneration zone having a moisture content of less than 1 per cent by weight and plume content less than 3 per cent by weight contaminant on catalyst whereby the plume will be removed by burning in the regeneration zone.

10. In a continuous process for the conversion of hydrocarbons wherein a granular adsorbent catalyst is passed cyclically through a reaction zone in which the catalyst contacts hydrocarbon fluid to effect the conversion of the hydrocarbon fluid and a regeneration zone wherein the catalyst is contacted by a combustion supporting gas to effect the regeneration of the catalyst, the method for removing small amounts of plume from the flue gas produced in the regeneration zone which comprises: maintaining a downwardly gravitating, substantially compact bed of fresh granular make-up catalyst within the lower section of a confined adsorption zone, supplying make-up catalyst containing substantial amounts of moisture to the upper section of said bed as a plurality of confined substantially compact streams, passing the plume containing flue gas upwardly through the lower section of said bed to effect removal of moisture from the catalyst and removal of plume from the flue gas by adsorption and condensation on the catalyst, removing a portion of the plume-free flue gas from said bed at a level below the upper surface thereof, passing the remainder of said plume-free flue gas through the upper section of said bed to effect removal of moisture from the catalyst to a level below 1.0 per cent by weight of the catalyst by slowing heating the catalyst therein at temperatures below 400° F., maintaining the average temperature in the lower section of said bed below about 600° F., passing flue gas from the upper section of said bed in indirect heat transfer relationship with said plurality of catalyst streams and heating the catalyst in said streams so that as said streams discharge on said bed the catalyst temperature is within the range 100° F. to 150° F., removing flue gas from said adsorption zone at a level above said bed and continuously passing the dried plume-containing catalyst from the lower section of said adsorption zone to said regeneration zone and burning the plume from the catalyst in said regeneration zone.

References Cited in the file of this patent

UNITED STATES PATENTS

| | | |
|---|---|---|
| 2,424,467 | Johnson | July 22, 1947 |
| 2,561,409 | Ardern | July 24, 1951 |
| 2,661,321 | Schutte | Dec. 1, 1953 |